US008061403B2

(12) United States Patent
Tharp

(10) Patent No.: US 8,061,403 B2
(45) Date of Patent: *Nov. 22, 2011

(54) HAND-HELD PORTABLE LABELER

(75) Inventor: Clyde N. Tharp, Dayton, OH (US)

(73) Assignee: Avery Dennison Corporation, Pasadena, CA (US)

(*) Notice: Subject to any disclaimer, the term of this patent is extended or adjusted under 35 U.S.C. 154(b) by 905 days.

This patent is subject to a terminal disclaimer.

(21) Appl. No.: 11/801,281

(22) Filed: May 9, 2007

(65) Prior Publication Data

US 2008/0277066 A1 Nov. 13, 2008

(51) Int. Cl.

| | |
|---|---|
| ***B32B 37/12*** | (2006.01) |
| ***B32B 37/14*** | (2006.01) |
| ***B32B 37/26*** | (2006.01) |
| ***B65C 9/08*** | (2006.01) |
| *B32B 38/10* | (2006.01) |
| *B32B 38/14* | (2006.01) |
| *B32B 38/18* | (2006.01) |
| *B65C 9/06* | (2006.01) |

(52) U.S. Cl. ........ 156/579; 156/247; 156/443; 156/446; 156/540; 156/541; 156/542; 156/750

(58) Field of Classification Search .................. 156/184, 156/191, 247, 443, 446, 540, 541, 542, 750, 156/759–767

See application file for complete search history.

(56) References Cited

U.S. PATENT DOCUMENTS

| | | | | |
|---|---|---|---|---|
| 3,265,553 | A * | 8/1966 | Voigt et al. | 156/384 |
| 4,053,345 | A * | 10/1977 | Hamisch, Jr. | 156/384 |
| 4,490,206 | A * | 12/1984 | Makley | 156/384 |
| 4,871,269 | A | 10/1989 | Murata | |
| 5,049,228 | A | 9/1991 | Sato | |
| 5,174,669 | A | 12/1992 | Fushimi et al. | |
| 5,267,800 | A | 12/1993 | Petteruti et al. | |
| 5,486,259 | A | 1/1996 | Goodwin et al. | |
| 5,570,121 | A | 10/1996 | Mistyurik et al. | |
| 5,597,249 | A | 1/1997 | Mistyurik | |
| 5,642,666 | A | 7/1997 | Petteruti et al. | |
| 5,980,138 | A | 11/1999 | Shiozaki et al. | |
| 6,241,407 | B1 | 6/2001 | Huggins et al. | |
| D486,512 | S | 2/2004 | Arnold et al. | |
| 7,387,458 | B2 * | 6/2008 | Monteith et al. | 400/609 |

FOREIGN PATENT DOCUMENTS

| | | |
|---|---|---|
| EP | 0208203 | 1/1987 |
| EP | 0250910 | 1/1988 |

OTHER PUBLICATIONS

U.S. Appl. No. 11/333,845, filed Jan. 2006, Chin-Chuan Liu et al.

* cited by examiner

*Primary Examiner* — Sonya Mazumdar

(57) ABSTRACT

There is disclosed a hand-held portable labeler that enables the label web supply to be quickly threaded into the labeler. The path of the carrier web for the labels from the nip of the print head and platen roll, about the delaminator, into the nip between the platen roll and a pressure roll, and out of the labeler is short and the pressure roll is widely separable from the platen roll to facilitate threading.

1 Claim, 4 Drawing Sheets

HAND-HELD PORTABLE LABELER

BACKGROUND

1. Field

The embodiments of the invention relate to the field of hand-held portable labelers.

2. Brief Description of the Prior Art

The following documents are made of record: U.S. Des. Pat. No. D486,512; U.S. Pat. No. 5,049,228; U.S. Pat. No. 5,174,669; U.S. Pat. No. 5,267,800; U.S. Pat. No. 5,486,259; U.S. Pat. No. 5,570,121; U.S. Pat. No. 5,597,249; U.S. Pat. No. 5,642,666; U.S. Pat. No. 6,241,407; U.S. patent application Ser. No. 11/333,845 filed Jan. 18, 2006.

SUMMARY

An embodiment relates to a hand-held portable labeler including a hand-held portable housing having a handle and having space to receive a label roll comprised of a carrier web and labels disposed along and releasably adhered to the carrier web, a print head mounted on the housing, a driven platen roll cooperable with the print head to print on the labels, a delaminator disposed downstream of the print head and capable of delaminating printed labels from the carrier web, a mounting member, a shelf disposed on the mounting member downstream of the delaminator, an applicator disposed above the level of the shelf and in label applying relationship to the printed label, a pivot axis below the platen roll, the mounting member being pivotally mounted to the housing about the pivot axis, a pressure roll rotatably mounted on the mounting member, the platen roll and the pressure roll being the sole means to advance the carrier web, wherein the mounting member, the pressure roll and the shelf are pivotal as a unit about the pivot axis between an operating position in which the printed label is between the applicator and the shelf and in which the carrier web is in pressure relationship between the platen roll and the pressure roll and a non-operating position in which the platen roll and the pressure roll are spaced apart and accessible to the user for threading of the carrier web between the platen roll and the pressure roll.

The labeler can be quickly threaded as follows: after inserting a new label roll of a composite label web having labels releasably adhered to a carrier web into the labeler, the composite web is fed from the label roll to between the print head and platen roll and passed over the delaminator. With the shelf and pressure roll mounting member in the open position, wherein the pressure roll is spaced from the platen roll, the free end portion of the composite web can be inserted into the wide space between the platen roll and the pressure roll, and thereafter the mounting member can be pivoted to the operating position. With a slight tug on the free end portion of the composite web, any slack can be taken up and the labeler is ready for use. The web which is in the path between the nip of the print head and platen roll and between the nip of the platen roll and the pressure roll is taut and it remains taut so that peeling of successive labels at the delaminator can occur reliably.

BRIEF DESCRIPTION OF THE DIAGRAMMATIC DRAWINGS

DETAILED DESCRIPTION OF THE PREFERRED EMBODIMENTS

Figure 1:
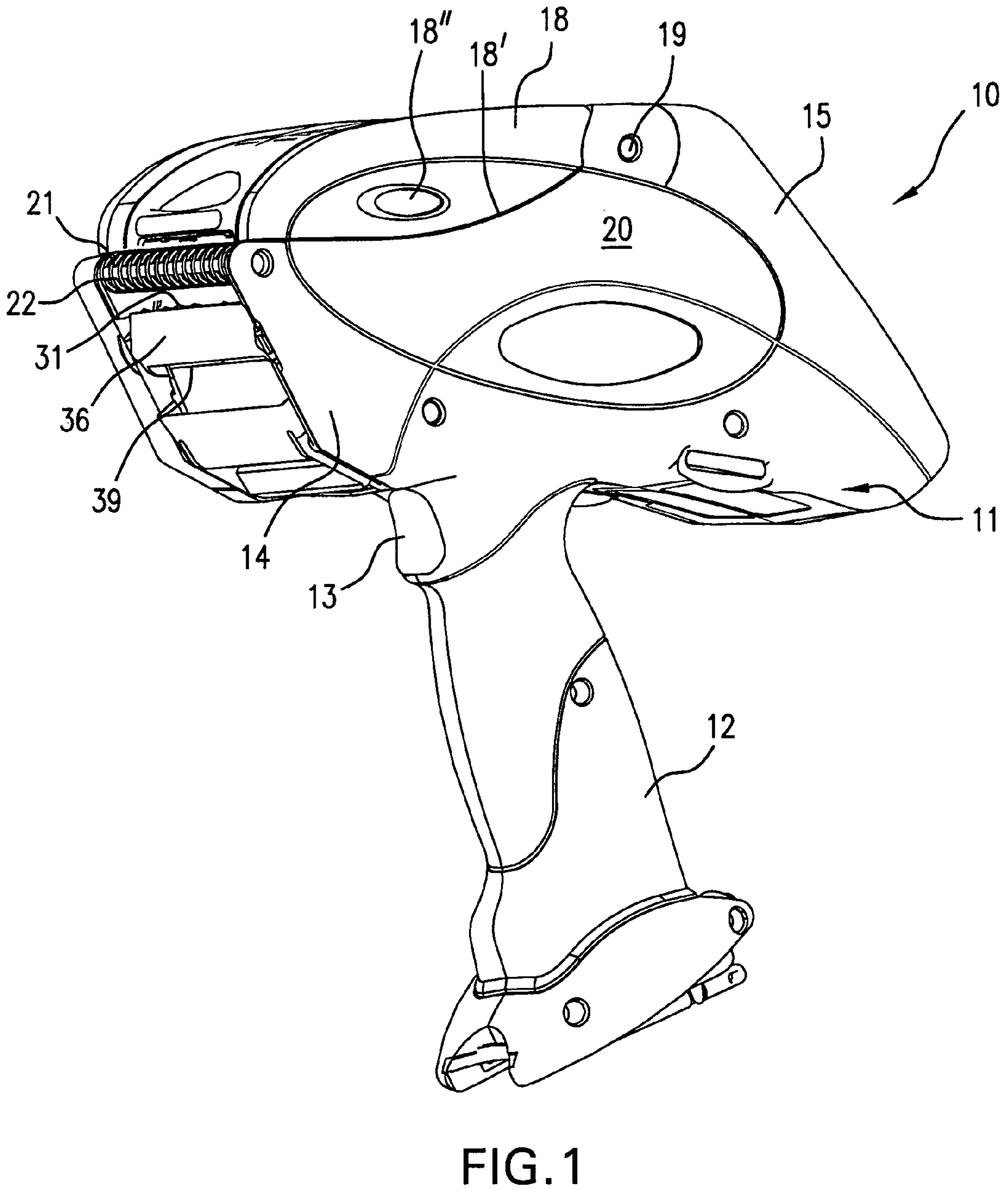
FIG. 1 is a pictorial view of a hand-held portable labeler in accordance with an embodiment, with a mounting member in its operating position.
Figure 2:
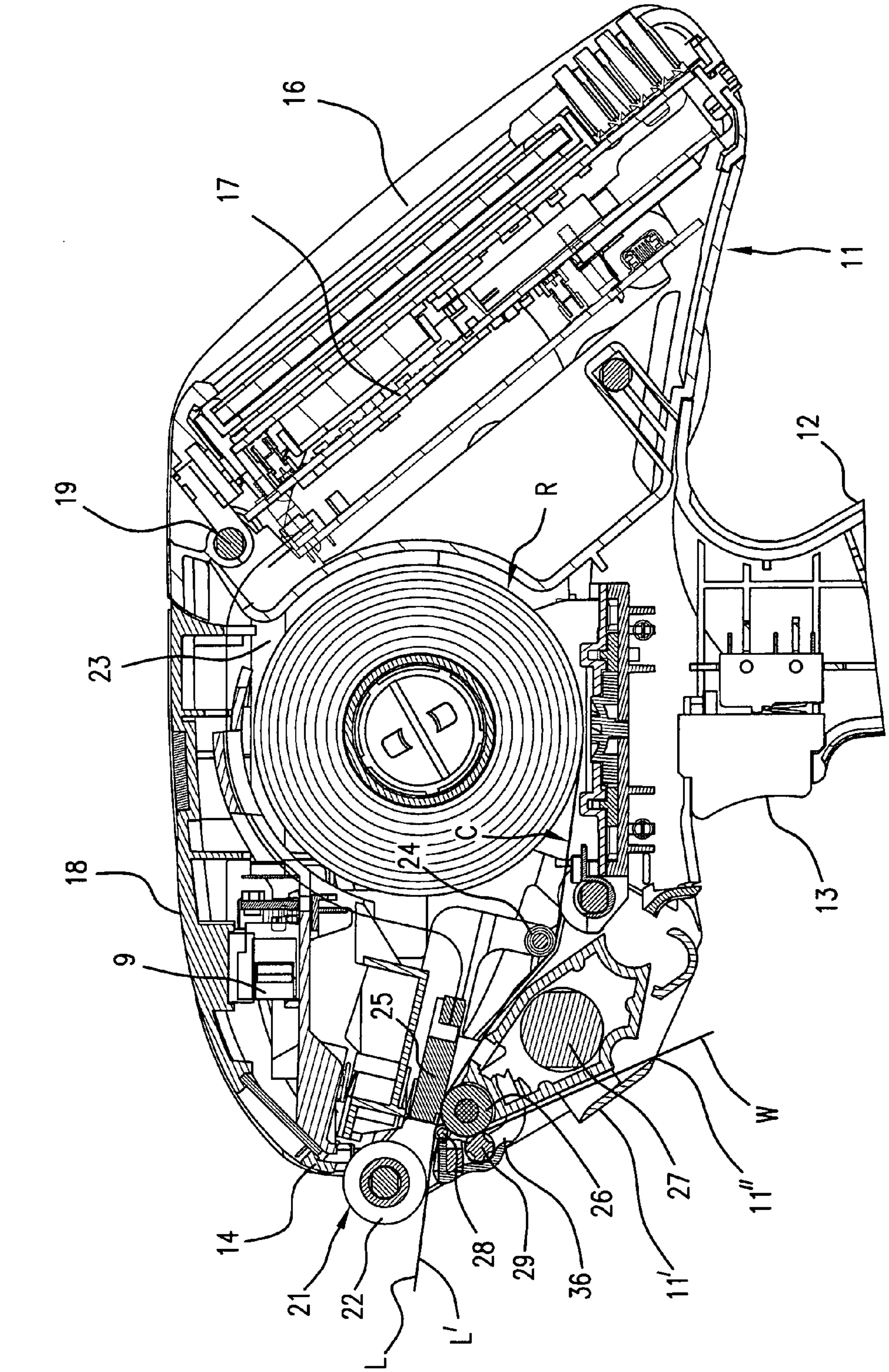
FIG. 2 is a sectional view of a fragmentary portion of the labeler shown in FIG. 1.

With reference to FIG. 1, there is shown a hand-held portable labeler generally indicated at 10. The labeler 10 includes a hand-held portable housing 11 including a manually graspable handle 12. A trigger switch 13 is disposed adjacent the handle 12. The trigger switch 13 underlies a front portion 14 of the labeler 10. A rear portion 15 of the labeler 10 includes a keyboard or touchscreen 16 and printed circuit boards 17 (FIG. 2). The housing 11 includes an upper housing section 18 pivotally mounted about a pivot 19 and releasably latched to a lower housing section 20. A parting line between the upper and lower housing sections 18 and 20 is indicated at 18'. The handle 12 can extend downwardly and rearwardly from the front portion 14 and preferably contains a rechargeable battery (not shown). The front portion 14 includes an applicator generally indicated at 21 preferably in the form of an applicator roll 22. A laser scanner 9 is also mounted on the upper housing section 18 of the housing 12.

Figure 3:
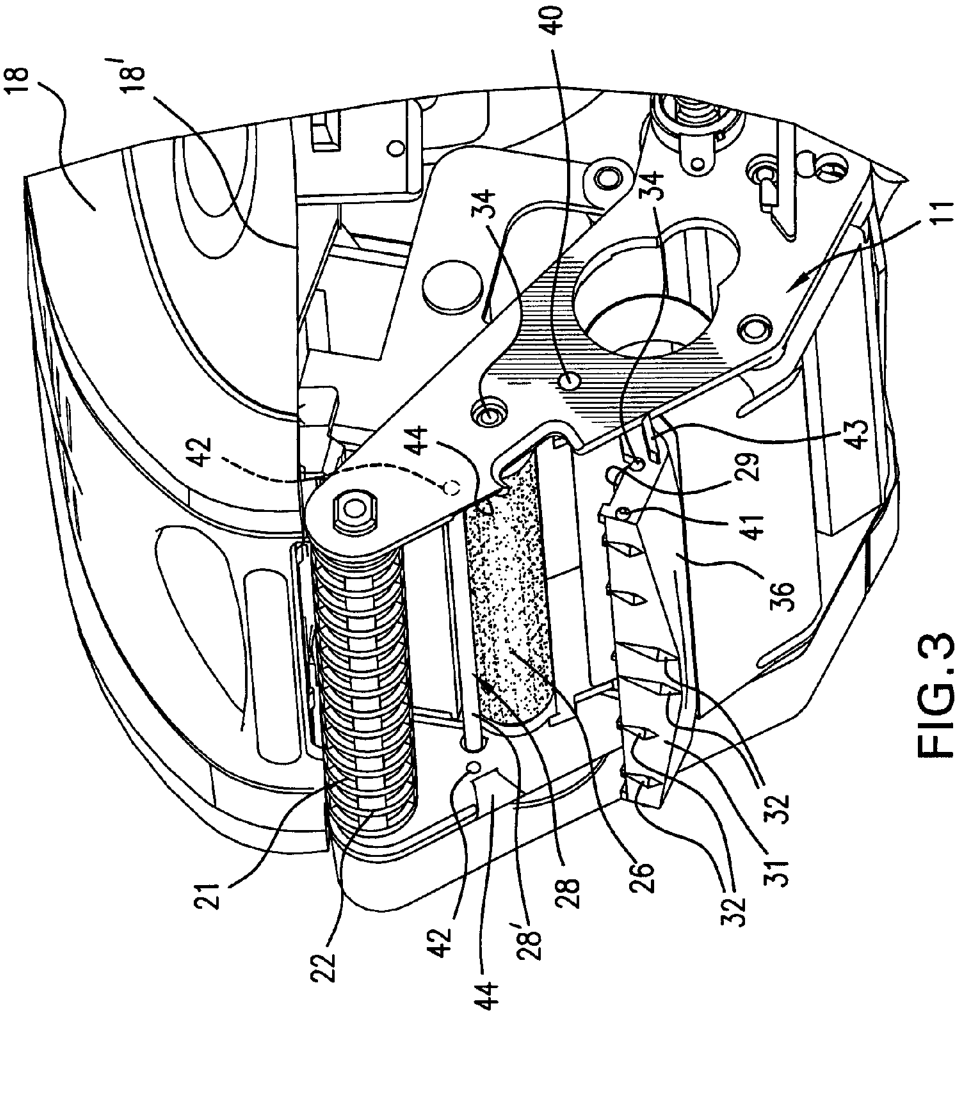
FIG. 3 is a fragmentary pictorial view of the front portion of the labeler, showing the mounting member in a non-operating, open position to enable easy threading of the labeler.

With reference to FIG. 2 it shows that the housing 11 includes a space 23 for a roll R of a composite label web C. The web C includes a carrier web W to which labels L are releasably adhered by tacky or pressure sensitive adhesive L'. The composite label web C can pass along a path from the roll R to beneath a guide or direction changing roll 24 and from there to the nip between a thermal print head 25 and a driven platen roll 26. The platen roll 26 is preferably comprised of a resilient material. An electric motor 27 is gear-connected to the platen roll 26 to drive or advance the composite web C and its web W while the print head 25 is printing on the leading label L. A delaminator generally indicated at 28 is disposed downstream of the print head 25 and the platen roll 26. The delaminator 28 can take the form of a small diameter roll 28' as shown in FIGS. 2 and 3 or a peel edge. As the composite web C passes from the print head 25 and platen roll 26 in the downstream direction, the web W is trained partially around the delaminator 28 where the web W makes an abrupt change in direction. Thus, the delaminator 28 is capable of causing the leading label L which has been printed to be delaminated from the web W. In the position shown in FIG. 2, a short trailing end portion of the leading label L still remains adhered to the web W so that the leading label L is in underlying or label applying relationship to the applicator roll 22. After the web W passes the delaminator 28, the web W passes between the platen roll 26 and a pressure-roll 29. The pressure roll 29 is in the operating position shown in FIG. 2, the pressure roll 29 exerts pressure against the web W which in turn exerts pressure against the platen roll 26. Accordingly, traction is applied to the web W both at the nip between the print head 25 and the platen roll 26 and at the nip between the pressure roll 29 and the platen roll 26 when the platen roll 26 is driven. In that the pressure roll 29 is preferably an idler roll, the driving force is applied by the platen roll 26 with assistance from the pressure roll 29 in maintaining good pressure contact of the web W with the platen roll 26. The pressure roll 29 is shown to be disposed forward of the platen roll 26. As best shown in FIG. 2, the web W exits at the front portion 14 of the housing 12 at the front of the labeler 10 a short distance after having passed between the nip of the platen roll 26 and the pressure roll 29.

Figure 4:
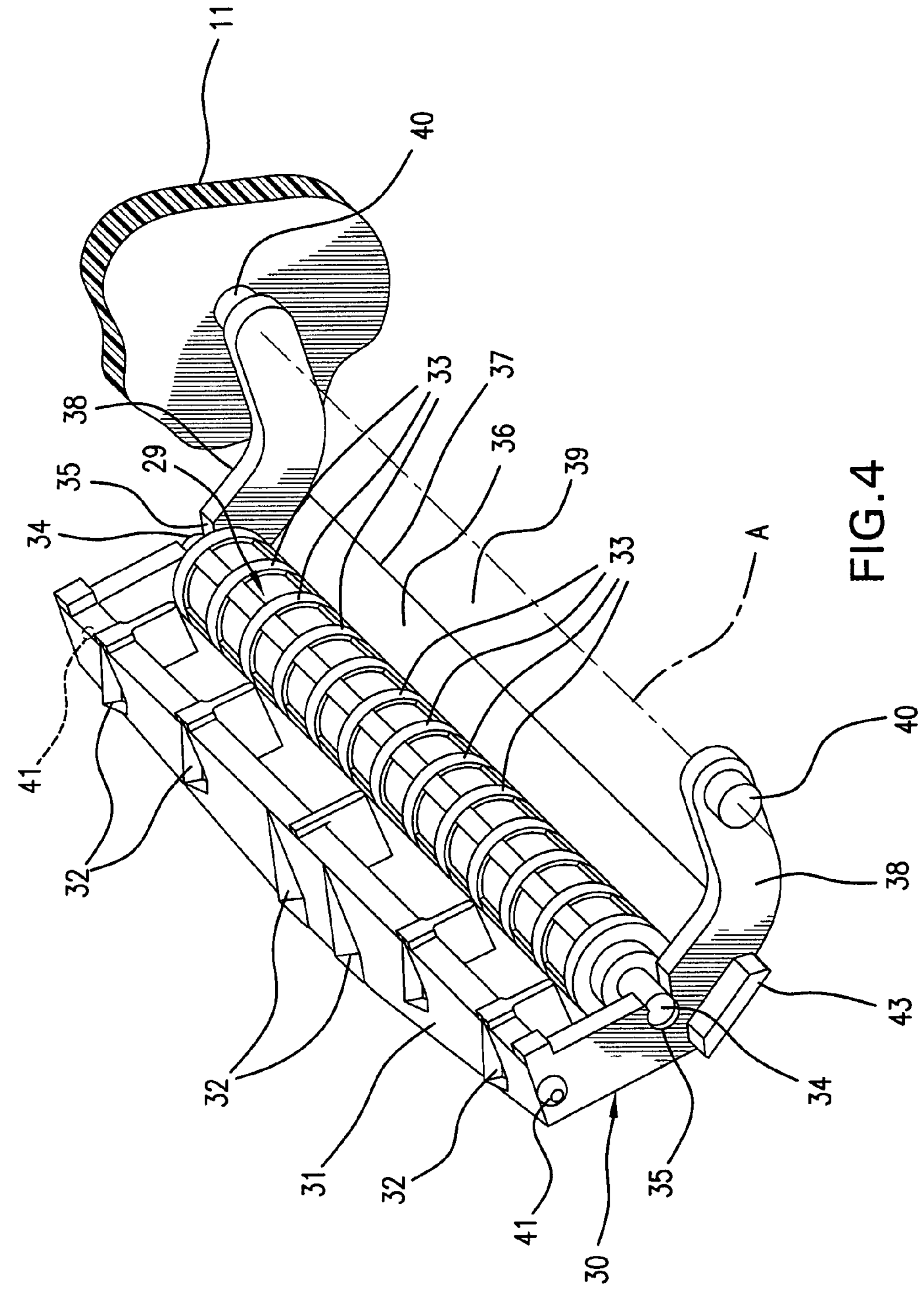
FIG. 4 is an enlarged pictorial view of the mounting member and a fragmentary portion of the housing or frame of the labeler.

With reference to FIGS. 3 and 4, there is shown a mounting member or holder generally indicated at 30 which mounts a shelf 31 and the pressure roll 29. The shelf 31 preferably has label-contacting ridges 32 which can support the essentially entirely delaminated leading label L. But for the shelf 31, the leading label L could droop below the level at which the applicator 21 can apply the leading label L to a product or surface, depending on the material composition of the labels L and/or the length of the trailing marginal edge of the leading label L which is still adhered to the web W. The pressure roll 29 is preferably comprised of a material such as plastic. The pressure roll 29 preferable has annular ridges 33 which contact the web W. The roll 29 include opposed stub ends or stub shafts 34 snap-fitted into C-shaped openings 35 in the mounting member 30. The pressure roll 29 is free to rotate as the platen roll 26 is driven. The mounting member 30 includes a curved front portion 36 which terminates at an edge 37. Each side of the mounting member 30 has a pair of leg portions 38 which extend beyond the edge 37. The edge 37 and the leg portions 38 provide an opening or passage 39 for the web W to exit the housing 11. Each arm 38 has an outwardly extending pivot or pivot portion 40 received in the housing 11 so that the mounting member 30 can pivot between an operating position shown in FIGS. 1 and 2 and an open, non-operating, or threading position shown in FIG. 3. The pivots 40 are aligned and extend along axis A.

As best shown in FIG. 2, the applicator 21 overlies the shelf 31 and the leading label L, and the leading label L can pass between the applicator 21 and the shelf 31 in label applying relationship to the applicator 21 in the operating position. The pressure roll 29 bears against the web W and the web bears against the platen roll 26 in the operating position. In the open position shown in FIG. 3, the composite web C can simply be advanced over the platen roll 26 and the delaminator 28 and the hand-fed or inserted downwardly in the throat between the platen roll 26 and the pressure roll 29 and through the opening 39. From there the web W can naturally enter a tapered chute 11' which may be part of the housing 11. The chute 11' terminates at a tear edge 11". In order to bring the shelf 31 into its label-supporting position and to bring the pressure roll 29 into pressure relationship with the platen roll 26, the mounting member 30 is manually pivoted about its axis A into the position shown in FIGS. 1 and 2.

The mounting member 30 has opposed projections 41 which fit into recesses 42 in the housing 12 to releasably hold the mounting member 30 in the operating position (FIGS. 1 and 2). The mounting member 30 and the housing 12 are constructed of molded plastics material and there is enough "give" or flexure to enable the mounting member to be snapped into and out of the operating position. A projection or stop 43 on one leg portion 38 limits the movement of the mounting member toward the operating position. The housing 11 has a pair of opposed, tapered, lead-ins 44 to facilitate guiding of the mounting member 29 to the operating position.

To load the labeler 10, the upper housing section 18 and the lower housing section can be opened by unlatching the upper housing section 18 from the lower housing section 20 by dispensing opposed buttons 18". When the upper housing section 18 is pivoted to its open position from the operating position shown in the drawings, the label roll R can be inserted into the label roll space 23 the same as in co-owned U.S. Pat. No. 5,486,259, the disclosure of which is incorporated herein by reference in its entirety. When the label roll R has been inserted into the labeler 10 with the free end portion of the composite web laid over the platen roll 26 and the delaminator 28 and extending to a position beyond the delaminator 28 and with the mounting member 36 in the open position, the remainder of the free end portion of the composite web C can be inserted into the space between the pressure roll 29 and the platen roll 26 and through the chute 11'. Then the mounting member 29 can be moved to the operating position and the free end portion that projects out through the chute 11' can be manually tugged to remove any slack, and the labeler 10 is ready to be operated.

Other embodiments and modifications will suggest themselves to those skilled in the art, and all such of these as come within the spirit of this invention are included within its scope as best defined by the appended claims.

I claim:

1. A hand-held portable labeler, comprising:

a hand-held portable housing having a handle and having space to receive a label roll comprised of a carrier web and labels disposed along and releasably adhered to the carrier web, a print head mounted on the housing, a driven platen roll cooperable with the print head to print on the labels, a delaminator disposed downstream of the print head and capable of delaminating printed labels from the carrier web, a mounting member, a shelf disposed on the mounting member downstream of the delaminator, an applicator disposed above the level of the shelf and in label applying relationship to the printed label, a pivot axis below the platen roll, the mounting member being pivotally mounted to the housing about the pivot axis, a pressure roll rotatably mounted on the mounting member, the platen roll and the pressure roll being the sole means to advance the carrier web, wherein the mounting member, the pressure roll and the shelf are pivotal as a unit about the pivot axis between an operating position in which the printed label is between the platen roll and the pressure roll and a non-operating position in which the platen roll and the pressure roll are spaced apart and accessible to the user for threading of the carrier web between the platen roll and the pressure roll.

* * * * *